2 INPUT LOGIC BLOCK

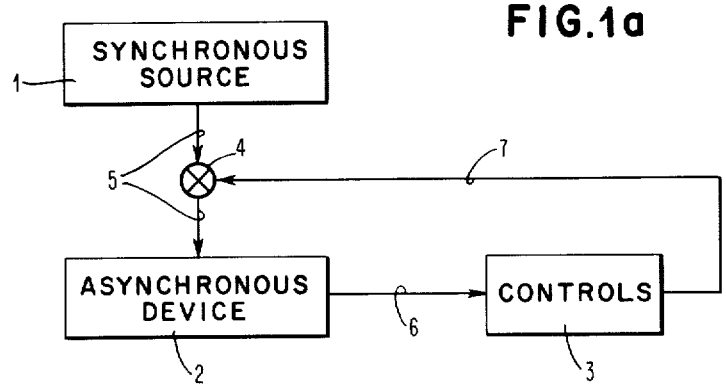
FIG.1a
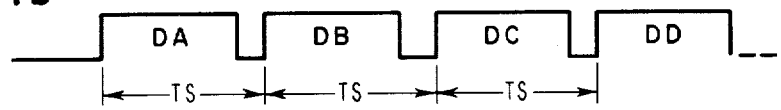
FIG.1b  SOURCE 1 DATA
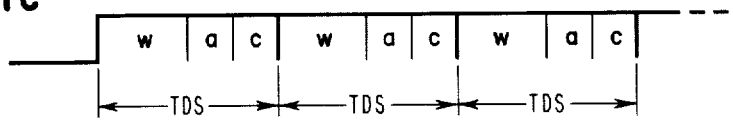
FIG.1c  DEVICE 2 "SLOW CYCLES"
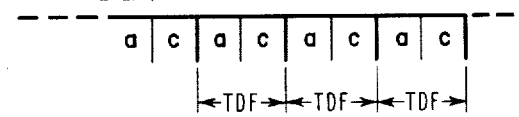
DEVICE 2 "FAST CYCLES"
FIG.1d
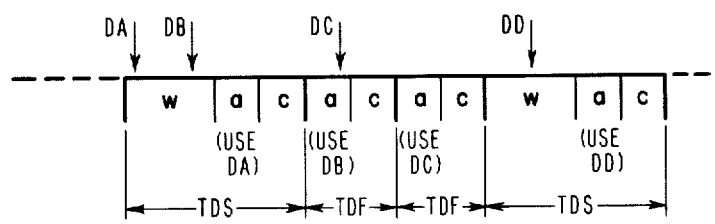
FIG.1e

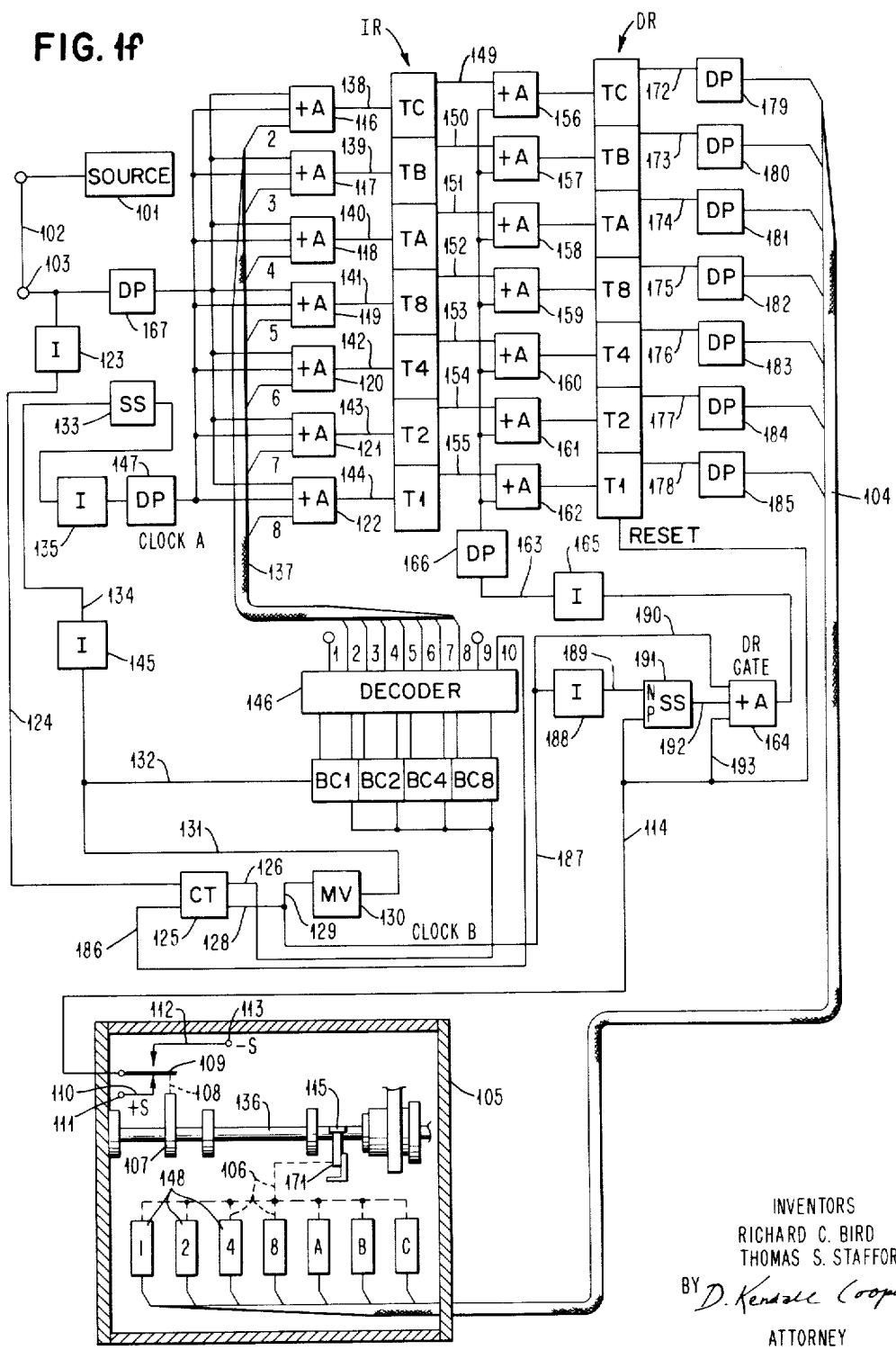

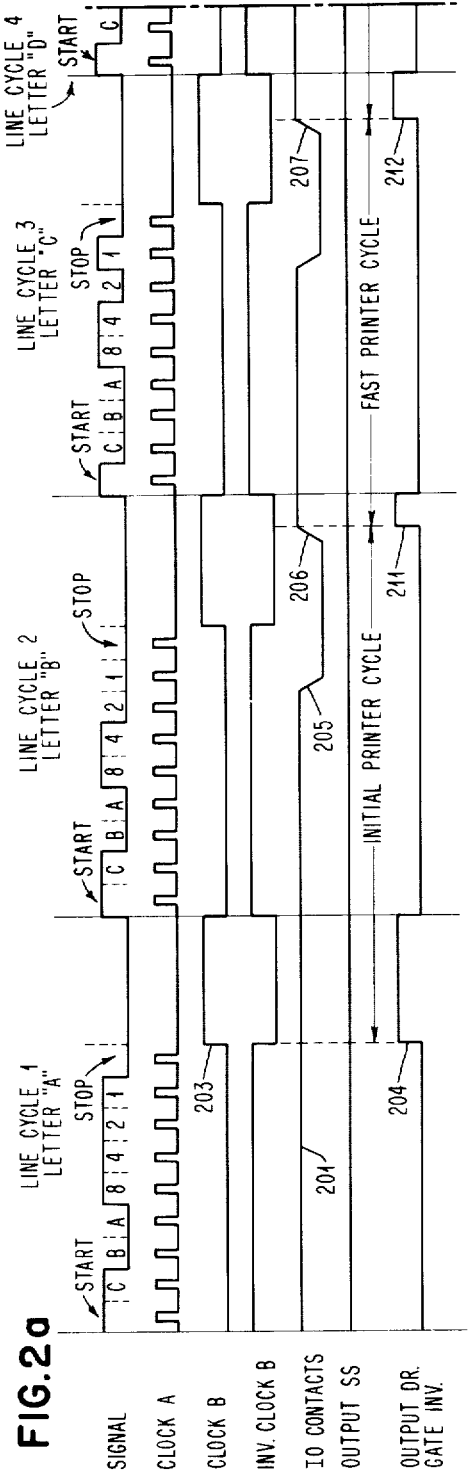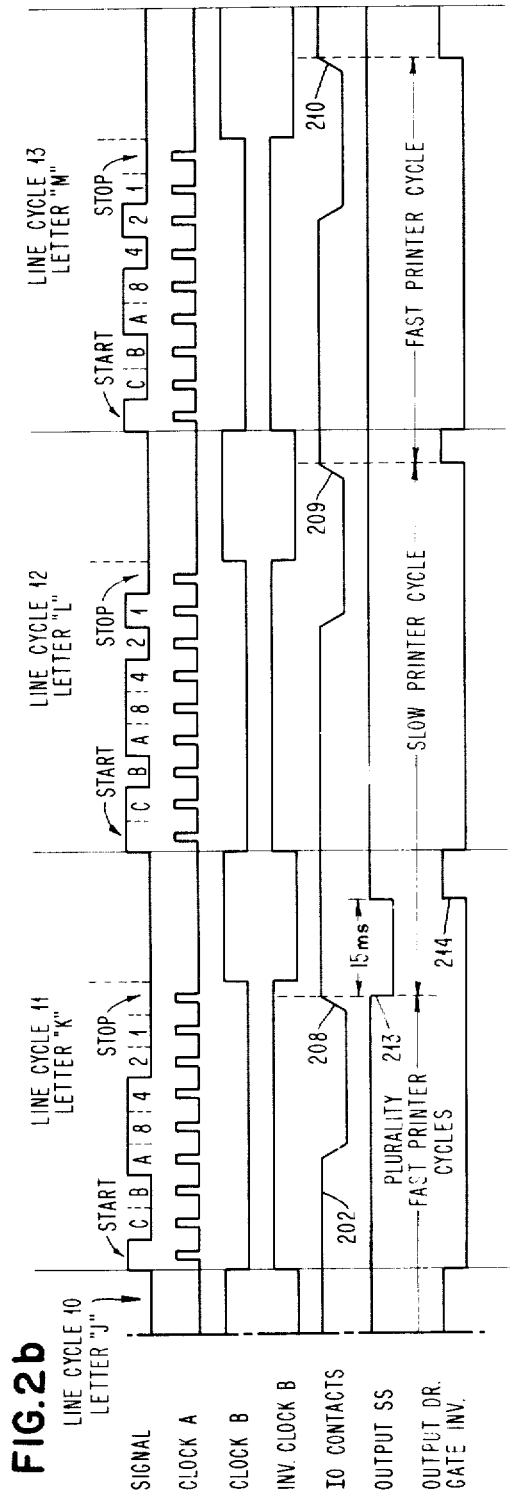

3 INPUT LOGIC BLOCK

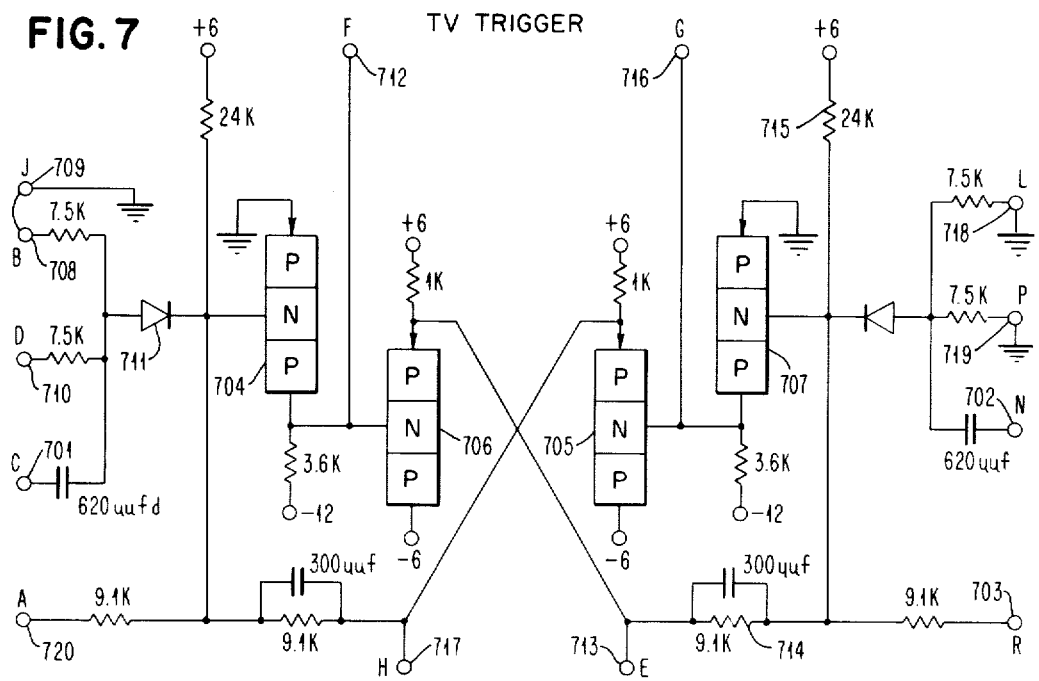
FIG. 7 TV TRIGGER
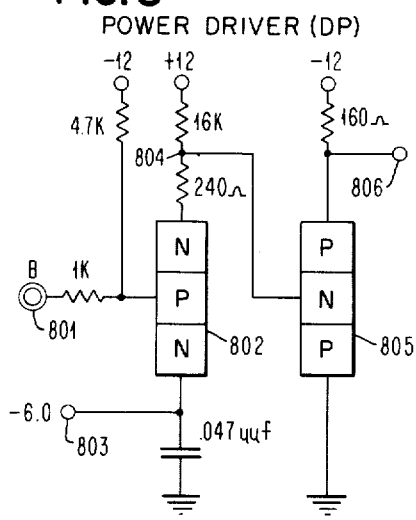
FIG. 8 POWER DRIVER (DP)
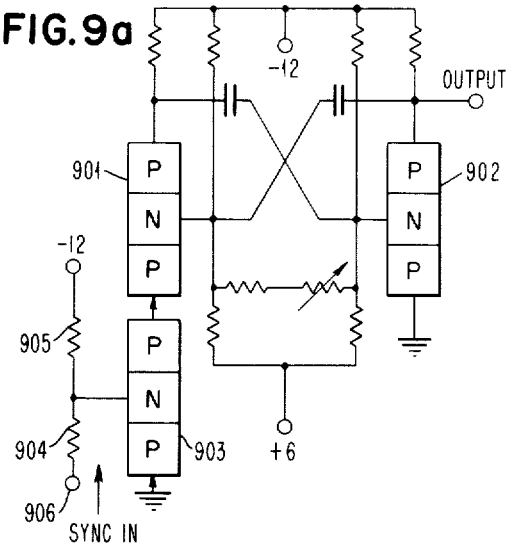
FIG. 9a
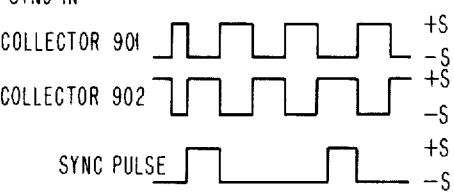
FIG. 9b

United States Patent Office 3,208,050
Patented Sept. 21, 1965

3,208,050
DATA SYSTEM WITH APERIODIC SYNCHRONIZATION
Richard C. Bird and Thomas S. Stafford, Poughkeepsie, N.Y., assignors to International Business Machines Corporation, New York, N.Y., a corporation of New York
Filed June 28, 1961, Ser. No. 120,323
4 Claims. (Cl. 340—172.5)

This invention relates to data handling systems, and more particularly to systems in which data is transferred between normally asynchronous equipments.

Data handling equipments which have different cyclic rates of operation are normally non-compatible and means must be provided to synchronize transfer of data from one to another. In the prior art one such device has usually been made subservient to another device which supplies master timing or gating pulses for controlling the entire system. Positive control has existed during each cycle, so that regardless of whether the first device operates at a faster or slower rate than the master device, it has remained dependent upon the master device for gating pulses during each and every one of its cycles of operation.

Ordinarily, the inclusion of timing and gating circuits of this kind in prior art systems has resulted in inefficiencies because of the requirement that compatibility be established and maintained during each cycle.

An object of the invention, therefore, is to provide a system in which compatibility is achieved between normally asynchronous data handling equipments with minimum supervision and control.

An additional object of the invention is to provide a data transfer system which is normally free-running, but which has aperiodic synchronization.

A further object of the invention is to provide a system in which maximum compatibility is achieved between a synchronous data source and an asynchronous device.

Another object is to provide a system in which transfer of data between data handling equipments which have different rates of operation is accomplished with efficiency and savings in time.

In order to accomplish these and other objects of the invention, a system has been provided which includes an asynchronous device that is normally cyclically operated under control of a synchronous source in a free-running manner, and which also includes controls for synchronizing the system only when a cycle of operation of the asynchronous device is displaced a predetermined amount with respect to a cycle of operation of the synchronous source.

The foregoing and other objects, features and advantages of the invention will be apparent from the following more particular description of the preferred embodiment of the invention as illustrated in the accompanying drawings.

In the drawings:

FIG. 1a is a block diagram generally showing a data handling system in which the invention may be used.

FIGS. 1b–1e are timing diagrams illustrating the operation of FIG. 1a.

FIG. 1f represents a data handling system in which the invention is incorporated.

FIGS. 2a and 2b represent a typical sequence of operation in the embodiment of FIG. 1.

FIGS. 3–9 represent basic circuits used in the embodiment of FIG. 1.

GENERAL DESCRIPTION

Figure 3:
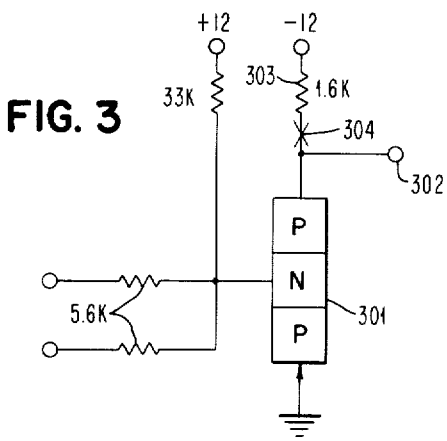

Data available at regular intervals can be supplied to an intermittantly operating mechanical device only during specified intervals. Referring to FIGURE 1a, controls 3 compensate for the relative speeds of a synchronous source 1 and an asynchronous device 2. Data is made available by the source 1, to the device 2 through a gate 4 interposed in a cable 5. Conditions in the device 2, sensed by controls 3 via line 6, result in the generation of signals on line 7 for operating the gate 4 to transfer data from the source 1 to the device 2.

Referring to FIGURE 1b, the source 1 makes data groups (DA, DB, DC, etc.) available, one group at a time, for a portion of a fixed interval TS. Referring to FIGURE 1c, the device 2, in the worst case, requires an interval TDS to accept and utilize each data group. A time "w" is required to "warm-up" the device 2 and a critical time "c" is required for undisturbed operation. Only during times "w" and "a" (the "accept" interval), can a new data group be accepted. Referring to FIGURE 1d, the warm-up interval "w" of a cycle may be eliminated, reducing the interval to TDF, if the data for that cycle is supplied prior to the critical time "c" of the previous cycle. The long sequence of efficient "fast" cycles shown results if the data groups are provided at the proper times. However, referring to FIGURE 1e, in practice only a mixture of fast and slow cycles is possible due to the relative rates of operating of the source 1 and device 2. The more fast cycles there are, the more efficiently the device 2 is used. It is the purpose of the controls 3 to supply data to the device 2 at times (shown by arrows in FIGURE 1e) calculated to provide a high ratio of fast to slow cycles.

The application of these principles will be described in detail below with respect to a mechanical device. Briefly in one type of printer, as is well known, a type-carrier is intermittently struck against paper under power, from a continuous drive. Power from the continuous drive is applied through a clutch to a shaft, which drives the type-carrier via a cam. When a character to be printed is supplied to the printer the type-carrier is appropriately positioned and the clutch is engaged. When engaged, the clutch causes the shaft to rotate the cam which, at some point, drives the type-carrier against the paper. Due to the inertia of the mechanical system, a slow cycle TDS of the sort shown in FIGURE 1c is initially performed if the shaft begins from rest. Once the shaft is in full motion, a new character may be supplied to reposition the type-carrier, after the current character is printed, without stopping the shaft. If this character is supplied early enough, before the clutch begins to disengage, the clutch remains engaged and the next shaft rotation starts "on the fly" and thus takes less time (a TDF cycle) than if it was stopped and then restarted (a TDS cycle). Naturally, the shaft will be completely stopped if no character is available by the time that the clutch is disengaged; which must occasionally occur because the source TS cycles are slower than the device TDF cycles. Note, however, that if the character is available while the clutch is disengaging (during critical period "c"), the clutch will not be allowed to engage until it is completely disengaged (after the critical period "c") to prevent damage to the clutch by "nipping."

BASIC CIRCUITS

Attention is directed to the basic circuits of FIGS. 3–9.

Figure 4:
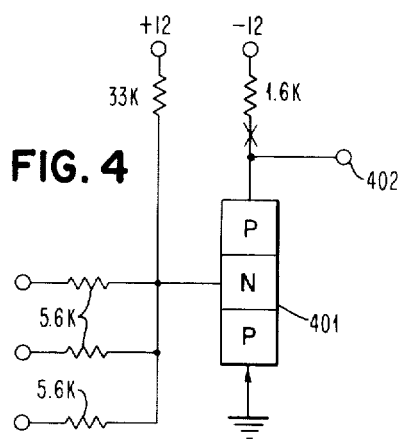

FIGS. 3 and 4 represent two basic complementary transistor or NOR logic circuits which are used in a number of configurations. Other circuits which are used herein are shown in FIGS. 5–9. FIG. 3 represents a two-input circuit, which includes a PNP transistor 301. FIG. 4 represents a circuit block which is similar to that of FIG. 3, with the exception that it has three inputs. This circuit includes a PNP transistor 401.

NOR logic is known in the art at the present time, and is described in numerous books and publications. An excellent general treatise appears in the book, "Design of Transistorized Circuits for Digital Computers," by A. I. Pressman, pages 190–220, published by John F. Rider Publisher, Inc.

Complementary transistor logic circuits are characterized by resistor input networks and inverted signal outputs. The transistors are usually operated in saturation when conducting. The logic of the block functional symbol is preformed by the resistor input network, while the transistor inverts and amplifies the resistor network output.

The voltage swing or line indicated below is encountered:

| S Line | −S Level | +S Level |
|---|---|---|
| Minimum | 5.6 volts to | −.2 volts |
| Maximum | 12.0 volts to | +.3 volts |

Both of the circuit blocks of FIG. 3 and FIG. 4 may be used for performing any one of three logical functions, that is, the complemented +AND function, the complemented −OR function, or the inversion function. When used for the inversion function, only one input line is used and the other input lines are left floating, or disconnected. The choice of which circuit to use depends on the number of inputs that have to be handled and the logical functions desired. With the component values and voltage levels shown, the functions of the circuits of FIGS. 3 and 4 are obtained in the following manner:

| Function | Inputs | Output |
|---|---|---|
| Complemented +AND. | All inputs zero volts | −6 to −12 volts. |
| Complemented −OR. | One or more inputs, −6 to −12 volts. | Zero volts. |
| Inverter | Single input, −6 to −12 volts | Do. |
|  | Single input, Zero volts (Remaining inputs, being disconnected are also at a zero level). | −6 to −12 volts. |

Attention is now directed to the other basic circuits shown in FIGS. 5–9.

Trigger (−TO)

Figure 5:
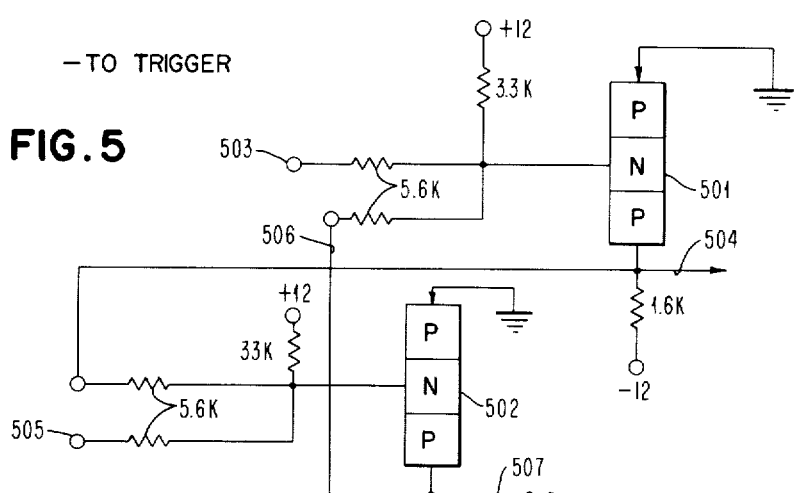

A detailed diagram of the −TO trigger is shown in FIG. 5. The trigger is a basic −OR circuit cross-coupled with another basic −OR circuit. This circuit is used for the Character Trigger CT in FIG. 1 and in the individual positions of an Intermediate Register IR and a Data Register DR, FIG. 1.

The trigger is bistable in nature. −S levels, previously discussed, are used for setting and resetting purposes. A −S level at the terminal 503 causes the PNP transistor 501 to conduct thus giving a +S level on the line 504. This state of the trigger and these levels will continue to exist until a −S level signal is applied at terminal 505 to cause the PNP transistor 502 to conduct. When transistor 502 conducts, the feedback on line 506 cuts off PNP transistor 501 and the trigger then assumes its off condition, with a −S output on line 504. Complementary S output levels can be obtained during each condition from line 507.

The basic +AND and −OR circuits are often coupled to perform a bistable trigger function such as the −TO trigger shown in FIG. 5. Each circuit continues to perform its own independent function, with outputs coupled back to inputs in such a manner that the status of the circuit can be maintained without a continuous active external input to either block.

Single-shot (SS)

Figure 6:
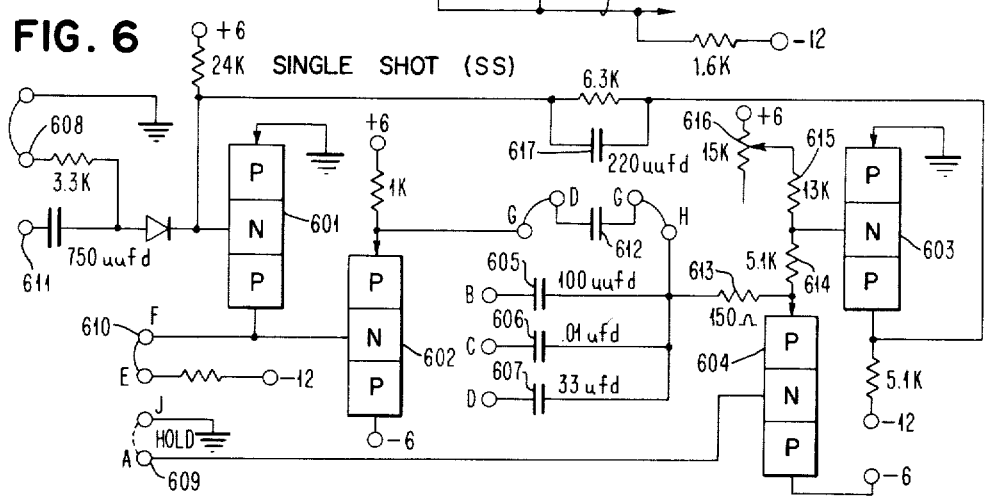

A gated single-shot circuit which is useful in the invention is shown in FIG. 6. The gated single-shot trigger circuit produces output pulses of a fixed time duration. The circuit consists of four PNP transistors 601–604 and three capacitors 605–607 of different values which are used in the time-out network. An external timing capacitor 612 can also be connected in the circuit. By changing the wiring to the various capacitors, different output pulse durations are possible. A positive shift to a gated input terminal 611 starts the single-shot action and provides a negative output pulse of a fixed time duration. This output pulse duration does not depend on the input staying up. A −S level at the gate input 608 prevents the positive shift from starting the single-shot action. Additional control of the circuit is possible with a special hold input, terminal 609. This input can be used to initially start or maintain the single-shot active output (−S) regardless of the other input levels. The output remains active for the selected pulse duration after the hold input is released.

A typical application of the single-shot using an external timing capacitor is shown. Both the gate and hold inputs are returned to ground (+S).

With the input gate 608 at +S and the input hold 609 at +S, the status of the circuit is: transistors 601 fully conducting, 602 and 604 partially conducting, 603 cut off, and output 610 at the +S level. A positive shift at input pin 611 through the input capacitor and the input diode, reverse biases transistor 601. Transistor 601 cuts off and transistor 602 base seeks −12 v. Output pin 610 falls to a −S level and transistor 602 reaches full conduction. A negative shift occurs at transistor 602 emitter, through the selected timing capacitor and 150 ohm resistor 613, and appears on the emitter of transistor 604. Transistor 604 cuts off. This negative voltage shift, developed across the network of resistors 613–615 and the 15K potentiometer 616 also appears at the base of transistor 603, and forward-biases the transistor 603 on.

A positive shift at the collector of 603 is coupled back to the base of 601 maintaining 601 cut off. This action is instantaneous through the coupling bypass capacitor 617. The circuit remains in this status while the selected timing capacitor charges through the resistor network toward +6 v. As soon as a base of 603 reaches ground, 603 cuts off and the coupling voltage to the base of 601 is lost. The input shaft has long since dissipated to ground through the input gate pin 608. Therefore 601 resumes conduction and output pin 610 rises to its former +S level. Transistors 602 and 604 resume partial conduction and the timing capacitor discharges through 604. The circuit is back to normal.

If the hold input is used, pin 609 is not returned to ground. An active output level can be maintained by establishing pin 609 at a −S level. Transistor 604 is biased to full conduction, lowering 603 base below ground; 603 conducts, and through the coupling to 601 base, 601 is cut off. Transistor 602 goes to full conduction causing 604 to conduct and drives the entire circuit to the same status as for an input signal. When the hold input is released (pin 609 rises to +S), the timing capacitor must again charge through the resistor network toward +6 v. The output at pin F will remain active until 603 is cut off by the rise in its base level and 601 again conducts.

TV Trigger

FIG. 7 is a detailed diagram of the TV trigger which is used in the individual positions of a Binary Counter BC, FIG. 1. The trigger may be connected for binary operation (gated or not gated) by connecting one of the gate resistors to the emitter follower output on the same side of the trigger. The other gate input may be then used as an external gate or tied to ground. The two A.C. inputs 701 and 702 are connected together and driven from a sample pulse driver to form the binary operation.

A.C. Set Input at Terminal C: For gated input operation the A.C. set pulse to pins 701 or 702 may be either a 3 v. or a 6 v. positive shift.

D.C. Set Input at Terminal 703: A signal of −5.56 v. (or more negative) applied to the D.C. set input triggers the circuit.

Assume a starting condition (FIGURE 7) of transistors 704 and 705 in full conduction. Transistor 706 is at minimum conduction, and transistor 707 is off. With one gate (pin 708) tied to ground (pin 209), and the other gate (pin 710) gated from —6 v. to 0 v. for 4.5 μs. before the A.C. input shift is applied, a positive going 3 v. pulse of 0.5 μs. is applied to the A.C. set input (pin 710). The output of the gate at diode 711 causes the base of transistor 704 to become more positive than the emitter (ground potential). Transistor 704 becomes reverse-biased off and its collector voltage tries to go to —12 v. Because of the diode action between the collector and base of transistor 706, the collector of transistor 704 is allowed to go only to —6 v. (pin 712). This negative —6 v. forward biases emitter follower transistor 706 into full conduction. The emitter of the transistor 706 follows the base to —6 v. The output of transistor 706 at pin 713 is coupled to the base of transistor 707 through the voltage divider resistors 714 and 715, forward-biasing transistor 707. The conduction of transistor 707 causes its collector (pin 716) to rise from —6 v. to 0 v. This collector voltage rise to 0 v. is fed to the base of transistor 705 and reduces the forward-bias of 705. The reduced bias on 705, which is connected as an emitter follower, reduces its conduction so that its emitter rises to 0 v. The emitter output of 705 (0 v.) at pin 717 is coupled back to the base of 704 and holds reverse-bias on 704, thus providing latch back to the circuit. If gating of pins 718 and 719 and an A.C. set pulse at pin 702 are applied, the trigger is flipped to its original state.

Power driver DP

The circuit of FIG. 8 is a power driver that provides impedance matching as well as higher current requirements to a driven line.

A +S input to terminal 801 causes NPN transistor 802 to conduct due to the forward-biasing that exists between the emitter (—6.0 volts from terminal 803) and the base. When transistor 802 conducts a +.2 or +.3 level will exist at the junction point 804.

With a +.2 volt potential at point 804, the PNP transistor 805 will be forward-biased into conduction and supply a +S level at the output terminal 806.

Multivibrator (MV)

The circuit of FIG. 9a is a transistorized multivibrator which is resynchronized by the injection of sync pulses whose repetition rate is lower than the natural frequency of the multivibrator. Transistors 901 and 902 are connected in the conventional cross-coupled manner to form a free-running multivibrator. The emitter of transistor 901 is connected to the collector of a third transistor 903, the emitter of the latter being grounded. The base of transistor 903 is connected to the junction of resistors 904 and 905 which extend between a —12 volt source and an input terminal 906. With terminal 906 at a —S potential, the base of transistor 903 is below ground and 903 saturates so that, in effect, the emitter of transistor 901 is clamped to the —S level and the multivibrator oscillates at its natural frequency.

The application of a +S volt sync pulse to terminal 906 when transistor 901 is conductive, as shown in FIG. 9b, cuts transistor 903 off which in turn cuts 901 off. The multivibrator remains in this state for the duration of the sync pulse. As terminal 906 shifts to —S with the fall of the sync pulse, transistor 903 again saturates to clamp the emitter of transistor 901 to ground and the multivibrator starts again.

If transistor 901 is cut off when the sync pulse occurs, it remains off for the duration of the sync pulse as indicated in FIG. 9b. Regardless of whether transistor 901 is conducting or not when the sync pulse is applied, resynchronization of the multivibrator is effected at the end of each sync pulse. The base electrode connection to transistor 903 from the synchronization input circuit provides a constant load and precludes the possibility of sync pulse delay and/or pulse distortion which would hinder resynchronization if the input circuit had a time varying impedance as its output load.

Other basic circuits in FIG. 1 such as the timing ring, the decoder, and the data registers can take forms that are well known in the art at this time. Adequate discussion of these circuits can be found in the book, "Pulse and Digital Circuit," Jacob Millman and Herbert Taub, McGraw-Hill Book Company, Inc., 1956 edition.

DETAILED DESCRIPTION

Referring now to FIG. 1, significant bits of information which are permutationally arranged to represent characters are generated by a synchronously operating source 101 and applied by way of a line 102 to a terminal 103. The source 101 is included in the synchronous source 1, shown in FIGURE 1a. Similarly, the asynchronous device 2, includes a typewriter or input-output printer 105 and the gate 4 includes +AND circuits 156–162.

The bits of information are accumulated bit by bit in an Intermediate Register IR, transferred parallel by bit to a final Data Register DR and from there directly applied by way of a bus 104 to selectively actuate electromagnets 148 in a typewriter or input-output printer 105.

The source equipment 101 may be of the type discussed in U.S. Patent 2,975,228, C. R. Doty et al., Data Transmission System, same assignee as this application, where data impulses are derived from a punched card. Other source media such as punched tape or manually or automatically operable typewriter equipment of well known configurations may be employed.

The printer 105 is capable of high speed operation such as 15 characters per second. A suitable printer is disclosed in U.S. Patent 2,919,002, L. E. Palmer, and is subsequently disclosed in a modified form for remote high speed operation in application Serial No. 109,704, filed May 12, 1961, F. E. Becker et al., both patent and application having the same assignee as the present application.

The basic printer in the Palmer patent has a single element typehead which is mounted on a carrier that moves longitudinally adjacent a platen. The typehead is provided with characters arranged in rows and columns. Various selecting links or latches are controlled by key levers in different combinations for rotating and tilting the typehead in order to present a desired character in typing position.

In the Becker et al. application, the basic printer of Palmer is modified in that the selecting links and latches are automatically actuated by electromagnets such as electromagnets 148, in response to signal impulses from a remote source.

As indicated symbolically in FIG. 1f, by lines 106, energization of the electromagnets 148 alone, or in combination, besides effecting the necessary character selection also causes the actuation of a helical spring clutch through the movement of an armature 171, so that a drive shaft 136 rotates and so that printing of the selected character is performed.

The electromagnets, clutch and drive shaft involved are not fully shown herein but are adequately disclosed and explained in the Palmer patent and Becker et al. application. The electromagnets 148 herein correspond to the electromagnets 48 in Becker et al., the armature 171 herein corresponds to the armature 71, and the shaft 136 herein corresponds to the shaft 36 in Becker et al.

In the present embodiment, the shaft 136 also has a cam 107, which, as indicated by line 108 operates on a center strap 109 that is part of a set of Input-Output (IO) contacts. The IO contacts comprise a normally closed strap 110 that is connected to a +S potential at a terminal 111, and further comprise a normally open strap 112 that is connected to a —S potential at a terminal 113.

The cam 107 and IO contacts are arranged so that transfer of the center strap from the normally closed to the normally open side and back again occurs during each cycle of operation of the printer 105.

Mechanical movement of the IO contacts and concurrent application of the +S (up) or —S (down) potentials to a control line 114 is indicated by the lines 201 in FIG. 2a and 202 in FIG. 2b, during successive cycles of operation of the embodiment of FIG. 1.

The cycles of operation in FIGS. 2a and 2b are predicated upon and represent the "line" cycle of the source 101.

The cyclic rate of operation of the source 101 is preferably chosen so that it is constant but is as close as practically possible to the fastest cyclic rate of operation of the printer 105. In other words, the duration of a line cycle, such as cycle 1 or 2 in FIG. 2a, always has a duration that is constant but that is slightly longer than the duration of the fastest printer cycle.

Each character in the system comprises nine bits of 0 or 1 binary significance as follows: Start bit, Check (C) bit, B bit, A bit, 8 bit, 4 bit, 2 bit, 1 bit, and Stop bit. The basic characters are made up of unique combinations of B, A, 8, 4, 2 and 1 bits. The C bit position is used for establishing odd or even redundancy within a character for checking purposes, as is well known in the art. The Start bit initiates a cycle for handling the character bits immediately following and the Stop bit indicates termination of the character. The Start bit is always a "1" or +S level, while the Stop bit is always a "0" or —S level.

As disclosed herein, each bit position has a 5 millisecond duration; therefore, each character of 9 bits has a 45 millisecond duration. An additional interval of 20 milliseconds is set aside in each line cycle as a guard interval to achieve the aforementioned cyclic relationship between the source 101 and the printer 105.

A basic line cycle is 45 plus 20 or 65 milliseconds which remains constant or synchronous. The fast printer cycle is considered herein to have a somewhat shorter duration which is more or less asynchronous, and which is of the order of 62–64 milliseconds.

The printer's operation is asynchronous, in that a number of different cyclic rates are encountered. When first starting, the initial cycle, as shown in FIG. 2a, comprises approximately 20 milliseconds of cycle 1 and approximately 60 milliseconds of cycle 2. This is due to the initial inertia of the printer in getting started.

A typical fast cycle, FIG. 2a, by contrast, encompasses 5 milliseconds of cycle 2 and 58 milliseconds of cycle 3 for a total of 63 milliseconds. A typical slow cycle in the printer, FIG. 2b, due to the synchronizing action, to be fully discussed, occupies 82–83 milliseconds.

When operating at the fast cyclic rate, the printer's mechanism for selecting a character to be printed during a particular cycle can be set up by selective energization of the magnets 148 during the previous cycle. In this case, the clutch for driving the shaft 136 never latches up, mechanical delays are minimized, and the printer 105 operates at a speed which corresponds to the speed of rotation of its drive shaft 136.

When operating at the initial cyclic rate, the clutch of the printer 105 has previously been latched up so that time is required for unlatching it and getting a print cycle underway. When a slow cyclic rate is established, the clutch is purposely latched up, and subsequently unlatched at a later more advantageous time.

Since the printer 105 operates somewhat more rapidly than the line rate, the application of a group of character pulses to the electromagnets 148 will occur progressively closer to the time in the printer cycle when the clutch for the drive shaft 136 is attempting to latch up. With this arrangement, a partial engagement or "nipping" action of the armature 171 with the projection 115 on the drive shaft 136 could occur. If this were permitted to exist, the clutch armature 171 and the projection 115 would be damaged.

It is desirable to energize the electromagnets 148 at a time during each line cycle which permits the fastest operation of the printer 105 but which avoids the aforementioned nipping action.

In FIG. 1 control bits and data bits received at the terminal 103 are applied through a Power Driver (DP) 167 to one input each of a group of +AND gates 116 through 122, and concurrently through an Inverter 123 by line 124 to a Character Trigger (CT) 125. The trigger 125 is of the —TO type, FIG. 5, and is set by a —S level from the Inverter 123 which results from the first +S level occurring in each line cycle, that is, the +S Start bit.

When set, the off-side output of the Character Trigger 125 on line 128 is at a —S level. This is applied by line 129 to a multivibrator (MV) 130, which is shown in greater detail in FIG. 9. The —S level applied to MV 130 initiates pulse generation therefrom on the line 131. The pulse rate corresponds to the basic line cycle bit rate in the system, which in this case is 200 cycles per second (5 milliseconds per bit).

Each pulse from the MV 130 on line 131 steps a Binary Counter (BC) by line 132 and also triggers a Single Shot 133 through an Inverter 145 by way of line 134. The Binary Counter comprises TV triggers such as that in FIG. 7, the respective positions being designated BC1, BC2, BC4, and BC8. The Single Shot 133 supplies —S sampling pulses which are inverted by I block 135 to become +S pulses designated Clock A pulses in FIGS. 2a and 2b. The Clock A pulses are applied through a Power Driver (DP) 147 to each of the +AND gates 116–122.

The outputs of the Binary Counter positions BC1–BC8 are directed to a decoder 146 which supplies a +S gating pulse at one of its outputs designated 1–10 when the Counter BC has a corresponding binary count.

As shown, the decoder 1 output which occurs during the Start bit interval of each character, is not used. However the outputs 2–8 are respectively directed to one input each of the +AND gates 116–122 by a bus 137. +AND gate 116 is conditioned at the second count level of the BC counter which corresponds to the C bit position of a character, so that if a C bit is present in an incoming character, +AND 116 output becomes —S on line 138.

+AND 117 is similarly conditioned at the third count level of the BC counter which corresponds to the B bit position of a character so that if a B bit is present in the incoming character, +AND 117 provides a —S level on line 139. The same applies to the other +AND gates 118–122 so that —S levels will exist under proper conditions on the lines 140–144 during succeeding bit intervals.

The —S levels from the +AND gates 116–122 are applied in succession, if present, to the respective positions of the Intermediate Register IR, which are —TO triggers such as that in FIG. 5, so that the bits of a character are loaded into the IR register in the corresponding register positions TC–T1.

+S outputs are derived from the individual positions of the IR register on lines 149–155 and directed to a group of +AND gates 156–162. The +AND gates 156–162 are conditioned through a Power Driver (DP) 166 under proper circumstances by a common —S gating level from +AND 164, which becomes +S on line 163 after inversion by I block 165.

The gating of +AND gates 156–162 will result in the transfer of data bits in parallel from the IR register to the final Data Register (DR). The DR register has —TO triggers like the IR register, and has corresponding bit positions TC–T1. The loading of the DR register results in +S outputs on lines 172–178 corresponding to the bit configuration of the character loaded. These +S levels are applied through Power Drivers 179–185 over the bus 104 to selectively energize the electromagnets 148 in the printer 105.

A count of 10 from the decoder 146 which occurs at the end of the Stop bit interval, resets the Character Trigger 125 over line 186. The outputs of the Character Trigger 125 then become —S on line 126 and +S on line 128.

The −S output on line 126 resets the Binary Counter. The +S output on line 128 by line 129 degates the multivibrator 130, so that no further counting occurs during the remainder of the cycle. The Character Trigger 125 could be reset at a count of 9 if desired. The Clock B and Inverted Clock B pulses would then start near the beginning of the Stop bit interval rather than at the end, as shown. This would result in a 25 millisecond guard interval rather than a 20 millisecond interval.

The same +S output on lines 128 and 187 is designated Clock B in FIGS. 2a and 2b. When inverted by I Block 188, the +S level becomes −S on line 189 and is designated Inverted (Inv.) Clock B in FIGS. 2a and 2b.

The gating of data bits from the IR register to the DR register is under control of a "DR Gate," +AND 164, as noted. One input of the DR Gate +AND 164 is conditioned by Clock B from trigger 125 on line 190. Another input is conditioned by the output of a Single Shot 191, which is normally +S on line 192. The third input of the DR Gate 164 is conditioned by a +S from the normally closed IO contacts in the printer 105 on lines 114 and 193.

The operation of the invention will now be considered by referring to FIG. 1f in conjunction with FIGS. 2a and 2b which together represent a typical sequence of line cycles in the embodiment of FIG. 1. FIG. 2a covers cycle 1 through cycle 3 and part of cycle 4. FIG. 2b covers part of cycle 10 and cycle 11 through cycle 13.

It will be assumed that the sequence in FIGS. 2a and 2b occurs as a result of the transmission of a series of test characters from the source 101.

The letter A is sent during cycle 1, the letter B in cycle 2, and corresponding letters of the alphabet in other cycles, ending with the letter M in cycle 13.

The bits of the first character A are received and loaded in the IR register as described, with the Character Trigger 125 having been set by the Start bit. Since the Printer 105 is assumed to have not been operating previously, the IO contacts will be in their normally closed position, so that a +S is applied on lines 114 and 193 to the DR Gate 164. The output of the Single Shot 191 will also be +S on line 192. As soon as the Stop bit is recognized and the Character Trigger 125 reset, the Clock B lines 187 and 190 become +S as indicated by waveform 203, FIG. 2a. All inputs of the DR Gate 164 are now conditioned so that its output is −S and so that its associated Inverter 165 output is +S on line 163. This is indicated by waveform 204 in FIG. 2a.

The +S output from the DR Gate Inverter through the Power Driver 166 gates all +AND gates 156–162 to transfer the first character A from the IR register to the DR register. The printer is immediately actuated from the Power Drivers 179–185, and goes through its initial print cycle.

Sometime during the latter part of each print cycle the IO contacts transfer from their normally closed position to their normally open position, as indicated by waveform 205, and back again to a normally closed position, as indicated by waveform 206. Actually, some additional printer cycle time would usually follow the reclosing of the IO contacts for latching up the mechanisms and clutches in the printer, but since the gating action of the embodiment of FIG. 1 primarily depends on the condition of the IO contacts, and for illustrative purposes each printer cycle will be assumed to have ended with the reclosing of the contacts at 206, 207, 208, 209, and 210, FIGS. 2a and 2b.

It will be recalled that the line cycle is pre-established to be slightly longer than the fast printer cycle.

The reclosing of the IO contacts at 206, at the end of the initial printer cycle, FIG. 2a, occurs about 5 milliseconds before the end of the second line cycle. Assuming that the letter B was received during line cycle 2, the reclosing of the IO contacts at 206 results in conditioning the DR Gate 164, so that the +S output from its associated Inverter 165 occurs late in line cycle 2 as indicated by the waveform 211.

The letter B is then printed by printer 105 during the fast printer cycle which follows the initial printer cycle.

Since the printer cycle is slightly faster than the line cycle, the reclosing of the IO contacts will occur just slightly earlier in line cycle 3 at 207 as compared with the reclosing in line cycle 2 at 206. Since the bits of character C have been accumulated in the IR register prior to the reclosing of the IO contacts at 207 in line cycle 3, the circuit of FIG. 1 is ready, and the +S output of Inverter 165 from the DR Gate 164 occurs late in line cycle 3 as indicated by waveform 212. The leading edge of the gating pulse 212 occurs about 7 to 8 milliseconds before the end of line cycle 3 as contrasted with the leading edge of the previous DR gating pulse 211, which occurred at a relatively later cycle time or about 5 milliseconds before the end of line cycle 2. The printing of the character C takes place during line cycle 4.

A comparable sequence of events occurs during line cycles 4 through 10 which are not shown in their entirely, with the IO contacts reclosing just slightly earlier in each cycle when compared with the preceding cycle.

Finally, in line cycle 11, the reclosing of the IO contacts occurs during the Stop bit interval of the character K at waveform 208.

It is desirable to resynchronize the printer with the line when the IO contacts close at a time as early as this in order to prevent gating the character K immediately and to thus avoid the nipping action previously discussed.

When the IO contacts close at 208 in line cycle 11, the Character Trigger 125 is still in its set condition. The output from the trigger 125 on lines 128 and 187 is −S. The inverted output from I block 188 on line 189 is +S at this time. The Single Shot 191, which is like that in FIG. 6, has an N and a P input. The N input is now +S and when the IO contacts reclose at 208 in FIG. 2b, the P input is also +S. These gate inputs result in the Single Shot being fired, and its output on line 192 then becomes −S for an interval of time, as indicated by the −S level 213, FIG. 2b. The interval of time during which the output of the Single Shot 191 on line 192 remains −S should be greater than the period when nipping could occur, and in this case is 15 milliseconds. The interval should not exceed the duration of the Clock B pulse, since it is desirable to use a later portion of the Clock B pulse.

The purpose of the Single Shot 191 is to move the DR Gate Inverter 165 output to the latter part of the line cycle as at 214, and to thereby cause the printer 105 to go through a slow cycle to effect synchronization of line and printer.

With the output of the Single Shot 191 on line 192 at −S for 15 milliseconds, the DR gate 164 will be degated until the Single Shot times out and its output once again becomes +S.

When time out is completed, the +S pulse 214, FIG. 2b, gates the character K to the DR register and from there to the printer 105 which then cycles. The printer had not received any character bits since cycle 10, so the clutch for shaft 136 will have latched up during the time of the Single Shot delay. The helical spring clutch described in the Palmer patent may not have unwound completely however, so that the total time involved for the slow printer cycle, FIG. 2b, will be about 67 milliseconds plus the Single Shot delay of 15 milliseconds, or a total of approximately 82 milliseconds, as contrasted with the initial cycle of 80 milliseconds.

With a slow cycle interposed in this manner, the gating of characters to initiate succeeding printer cycles is repositioned toward the latter part of the corresponding line cycles again as in the first few cycles of FIG. 2a. However, since the printer gains on the line slightly during each successive line cycle, the time will again arrive when the IO contact reclosing occurs prior to the reset of the character trigger 125. The Single Shot 191 will again be fired, and the synchronizing action just described will take place.

The synchronization action is aperiodic in nature since its occurrence depends upon the timing relationships between the line source and the printer. If the printer cycle slows to some extent, it would require a greater number of line cycles than that indicated before synchronization would be necessary. In effect, the printer would not gain as much during each line cycle as under the described circumstances, where synchronization occurred during the 11th line cycle. When the printer did not gain as much, synchronization might occur only every 15th or 16th cycle. When the printer gained more, synchronization might occur every 8th or 9th line cycle.

It can be seen that a novel synchronizing system has been developed wherein a utilization device is permitted to operate in a free-running manner under control of signals from a synchronous source, but wherein periodic synchronization is performed just prior to the time when the operating conditions of the device would have become non-compatible with respect to the arrival of the signals from the source.

While the invention has been particularly shown and described with reference to a preferred embodiment thereof, it will be understood by those skilled in the art that various changes in form and detail may be made without departing from the spirit and scope of the invention.

What is claimed is:

1. In combination:
    a data source, operable in cycles, for making new data available during the same portion of each successive cycle;
    a data transfer means, connected to said source, operable to transfer data available from said source;
    a data receiver, connected to said transfer means, normally operable in a first cycle, and operable in a second cycle when data is received during predetermined portions of a preceding cycle–
    sensing means, connected to said data receiver for supplying signals representing points in the operation of said data receiver; and
    control means, interconnecting said sensing means and said transfer means for operating, as a function of said signals, said transfer means to transfer data to said receiver at times which permits said receiver to operate with a maximum ratio of first cycles to second cycles.

2. The combination recited in claim 1, wherein:
    said data source operates in cycles of fixed length; and
    said data receiver operates in first cycles having a fixed length less than said data source cycles, and second cycles having a fixed length greater than said data source cycles.

3. The combination, as recited in claim 2, wherein:
    said data receiver is a dynamic mechanical device, one position in the motion of which corresponds to a point in a cycle prior to which point data must be received in order for the next cycle to be a first cycle; and
    said sensing means supplies a signal each time that said device moves to said position.

4. The combination comprising:
    an input for serially supplying signals, groups of which signals represent characters;
    assembly circuits, connected to said input, for receiving said signals serially, assembling successively received signals into characters and indicating, by a first signal, each time that a character has been assembled;
    utilization means, operable to process characters in selected ones of a slow cycle and a fast cycle, characters received before a fixed point in each cycle being processed during a succeeding fast cycle and characters received after said fixed point being processed during a succeeding slow cycle;
    transfer means, interconnecting said assembly circuits and utilization means, operable to transfer a character from said assembly circuits to said utilization means;
    gating means, placed in said transfer means, operable by a second signal to make said transfer means operable to transfer a character;
    sensing means, connected to said utilization means for generating a third signal when said fixed point is sensed during a cycle of said utilization means; and
    control means, interconnecting said assembly circuits sensing means and gating means, operable as a function of said first and third signals to generate said second signal.

References Cited by the Examiner

UNITED STATES PATENTS

| 1,946,436 | 2/34 | Bissell | 340—147 |
| 2,468,256 | 4/49 | Espley | 178—7.5 |
| 2,736,770 | 2/56 | McNaney | 178—69.5 |
| 2,905,930 | 9/59 | Golden | 340—172.5 |
| 2,956,126 | 10/60 | Jipp | 178—69.5 |
| 2,958,851 | 11/60 | Smith. | |
| 2,986,723 | 5/61 | Darwin et al. | 340—146.1 |
| 3,051,787 | 8/62 | Parks | 178—69.5 X |

MALCOLM A. MORRISON, *Primary Examiner.*